United States Patent [19]

Mori et al.

[11] Patent Number: 4,986,840

[45] Date of Patent: Jan. 22, 1991

[54] CHARCOAL CANISTER FOR USE IN A FUEL PURGE SYSTEM OF AN INTERNAL COMBUSTION ENGINE

[75] Inventors: Eiji Mori, Okazaki; Hidefumi Sonoda, Toyota; Akira Hiraku, Toyota; Morio Minezawa, Toyota; Isao Kato, Toyota; Koichi Ito, Toyota, all of Japan

[73] Assignee: Toyota Jidosha Kabushiki Kaisha, Toyota, Japan

[21] Appl. No.: 392,829

[22] Filed: Aug. 11, 1989

[30] Foreign Application Priority Data

Aug. 11, 1988 [JP] Japan .......................... 63-105406[U]

[51] Int. Cl.5 .............................................. B01D 53/00

[52] U.S. Cl. ......................................... 55/316; 55/387; 123/519

[58] Field of Search .................. 55/316, 387; 123/519, 123/520, 521; 228/184, 215

[56] References Cited

U.S. PATENT DOCUMENTS

| | | | |
|---|---|---|---|
| 2,758,367 | 8/1956 | Dougherty | 228/184 |
| 3,465,420 | 9/1969 | Webb et al. | 228/215 |
| 3,851,353 | 8/1974 | Toth | 55/387 |
| 4,058,380 | 11/1977 | King, II | 55/387 |
| 4,326,489 | 4/1982 | Heitert | 123/520 |
| 4,714,485 | 12/1987 | Covert et al. | 123/519 |
| 4,750,923 | 6/1988 | Haruta et al. | 55/387 |
| 4,758,255 | 7/1988 | Yamada et al. | 55/316 |
| 4,766,872 | 8/1988 | Kato et al. | 123/519 |
| 4,836,172 | 6/1989 | Haruta et al. | 123/521 |

FOREIGN PATENT DOCUMENTS

| | | | |
|---|---|---|---|
| 1261799 | 2/1968 | Fed. Rep. of Germany | 228/184 |
| 54-58513 | 4/1979 | Japan . | |
| 55-73315 | 6/1980 | Japan . | |
| 58-176094 | 10/1983 | Japan | 228/184 |
| 61-55153 | 4/1986 | Japan . | |

*Primary Examiner*—Jay H. Woo
*Assistant Examiner*—C. Scott Bushey
*Attorney, Agent, or Firm*—Kenyon & Kenyon

[57] ABSTRACT

A charcoal canister having an activated carbon layer arranged in a central portion of an interior of the housing in an axial direction thereof and extending over the entire cross section of the interior, which is perpendicular to an axis of the housing. A first chamber is formed in the interior of one axial end of the housing and defined by one end of the activated carbon layer, and a second chamber is formed in the interior at the other axial end of the housing and defined by the other end of the activated carbon layer. A fuel vapor inlet pipe and a purge pipe are connected to the first chamber, and an air inlet pipe is connected to the second chamber. These pipes extend outwardly from a housing wall portion which defines the first chamber.

10 Claims, 4 Drawing Sheets

CHARCOAL CANISTER FOR USE IN A FUEL PURGE SYSTEM OF AN INTERNAL COMBUSTION ENGINE

BACKGROUND OF THE INVENTION

1. Field of the Invention

The present invention relates to a charcoal canister for use in a fuel purge system of an internal combustion engine.

2. Description of the Related Art

In a conventional charcoal canister, a fuel vapor inlet pipe and a purge pipe extend outwardly from one end of a housing of the charcoal canister, and an outside air inlet pipe extends outwardly from the other end of the housing. This arrangement wherein the pipes extend from both ends of the housing causes problems in that the pipe fitting work is complicated.

As a solution to this problem, the fuel vapor inlet pipe, the purge pipe, and the outside air inlet pipe are extended outwardly from only one end of the housing, and therefore, the pipe fitting work can be easily carried out.

FIG. 6 shows a conventional charcoal canister (for example, as disclosed by Japanese Unexamined Utility Model Publication No. 54-58513), wherein a space 80 is formed at the bottom of the housing 1 of the charcoal canister, and a first activated carbon layer 82 and a second activated carbon layer 83 are defined on the space 80 by a dividing plate 81 extending longitudinally therefrom. A purge pipe 21 connected to the first activated carbon layer 82, an outside air inlet pipe 19 connected to the second activated carbon layer 83, and a fuel vapor inlet pipe 20 connected to the space 80 are extended outwardly from the top wall of the housing 1.

In this charcoal canister, however, when a fuel purge is carried out (gas flows through the outside air inlet pipe 19, the second activated carbon layer 83, the space 80, the first activated carbon layer 82, and the purge pipe 21, in this order), the flow area is equal to a section area $A_1$ or $A_2$ of the first activated carbon layer 82 or the second activated carbon layer 83, i.e., about a half of the section area A of the housing 1, and an effective length of the activated carbon layer is equal to twice the length L of the housing 1. Therefore a problem occurs in that pressure loss in the charcoal canister is increased. Also, an effective area in which air and fuel vapor come in contact with the activated carbon is equal to a half of the section area A of the housing 1, and therefore a problem occurs in that a reaction velocity in the activated carbon is reduced.

SUMMARY OF THE INVENTION

An object of the present invention is to provide a charcoal canister capable of preventing an increase of a pressure loss and a drop of a reaction velocity in activated carbon, and of easing the pipe fitting work.

Therefore, according to the present invention, there is provided a charcoal canister for use in a fuel purge system of an internal combustion engine having an intake passage, wherein the canister comprises an axially extending housing; an activated carbon layer arranged in a central portion of an interior of the housing and in an axial direction of the housing and extending over the entire cross section of the interior of the housing, perpendicular to an axis of the housing; a first chamber formed in the interior of the housing at one axial end portion of the housing and defined by one end of the activated carbon layer; a second chamber formed in the interior of the housing at the other axial end portion of the housing and defined by the other end of the activated carbon layer; a first pipe connected to the first chamber for feeding fuel vapor into the first chamber, and extending outwardly from a housing wall portion which defines the first chamber; a second pipe connecting the first chamber to the intake passage and extending outwardly from the housing wall portion; and a third pipe connected to the second chamber for feeding air into the second chamber, and extending outwardly from the housing wall portion.

The present invention may be more fully understood from the description of preferred embodiments of the invention set forth below, together with the accompanying drawings.

DESCRIPTION OF THE PREFERRED EMBODIMENTS

Figure 1:
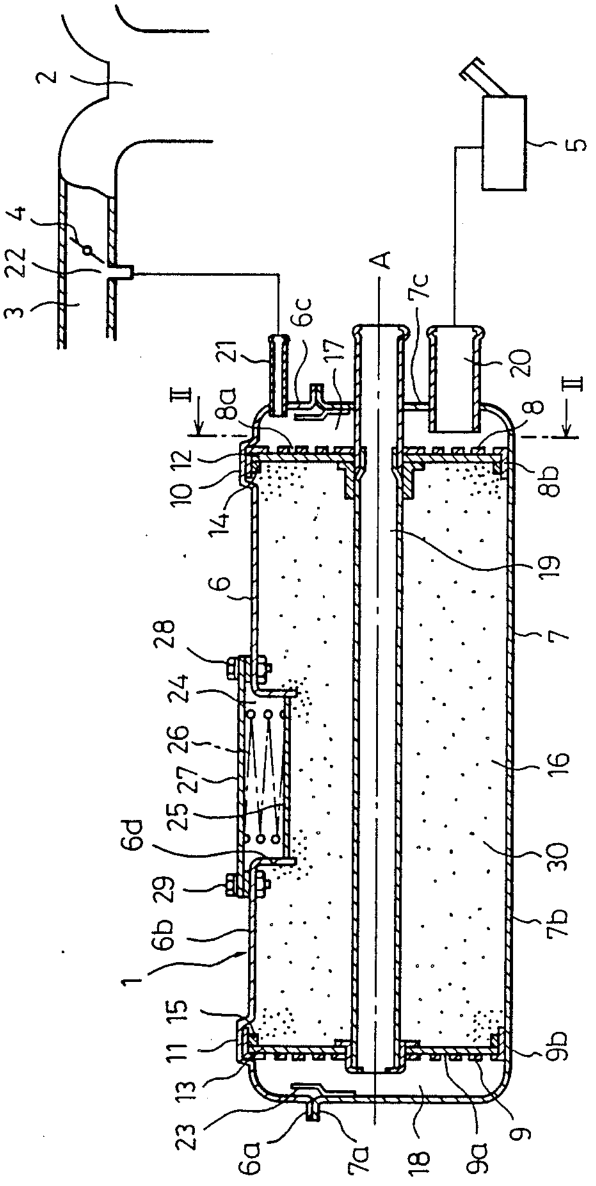
FIG. 1 is a longitudinal sectional view of the first embodiment of a charcoal canister of the present invention.
Figure 2:
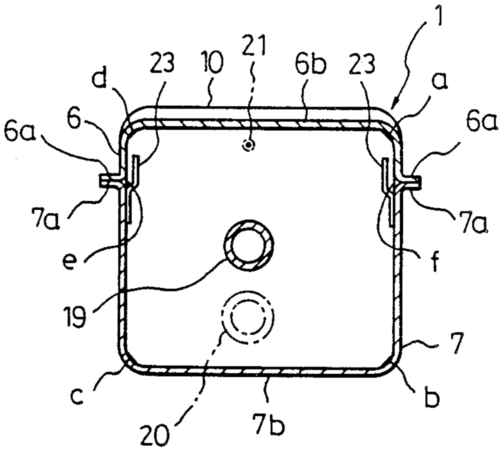
FIG. 2 is a cross-sectional view taken along the line II—II of FIG. 1.

FIGS. 1 and 2 are sectional views of a first embodiment of a charcoal canister according to the present invention.

Referring to FIGS. 1 and 2, 1 designates a housing, 2 an engine body, 3 an intake passage, 4 a throttle valve arranged in the intake passage 3, and 5 a fuel tank. The housing 1 is formed as an approximately rectangular parallelepiped, and comprises two housing elements, i.e., an upper housing 6 and a lower housing 7, separated along a line extending along a longitudinal axis A of the housing 1. Flanges **6*a* and 7*a* are formed at the ends of the upper and lower housings 6 and 7 respectively. The depth of the lower housing 7 is three times that of the upper housing 6, and thus when the flanges 6*a* and 7*a* are welded together, the connecting portion of the upper and lower housings 6 and 7 is positioned between the center axis of the housing 1 and the top of the upper housing 6. A first separator 8 and a second separator 9 have a shape and a dimension similar to the section of an interior of the housing 1, which is perpendicular to the longitudinal axis A, and are provided with a plurality of grooves 8*a* and 9*a* extending through the separators 8 and 9 and in parallel with the bottom wall 7*b* of the lower housing 7. The peripheral portions 8*b* and 9*b* of the separators 8 and 9 are formed as an L-shape, and the first and second separators 8 and 9 are welded to the inner wall of the lower housing 7 close to each end of the lower housing 7, respectively. First and second recesses 10 and 11 facing the first and second separators 8 and 9 are formed in the inner surface of the top wall of the upper housing 6**, and the top ends of the peripheral portions 8*b* and 9*b* of the separators 8 and 9 are fitted into these first and second recesses 10 and 11, respectively. In a conventional canister, the lower portions of the separators 8 and 9 must be welded to the inner surface of the lower housing 7 and securely fixed thereto, and since the upper portions of the separators 8 and 9 can not be welded to the inner surface of the upper housing 6, it was possible for the upper portions of the separators 8 and 9 to be moved out of position. Therefore, there was a possibility that the activated carbon would leak from the gap formed between the inner surface of the upper housing 6 and the upper portions of the separators 8 and 9 by mispositioning of the latter. In this embodiment, since the top ends of the separators 8 and 9 are fitted into the recesses 10 and 11, respectively, the upper portions of the separators 8 and 9 are securely fixed without welding, and therefore, even if the housing 1 is subjected to a heavy impact, the upper portions of the separators 8 and 9 will not shift from position, and thus activated carbon cannot leak.

First and second filters 12 and 13, made from nylon, are arranged on the side surfaces of the first and second separators, respectively, facing each other. The filters 12 and 13 are urged against the first and second separators 8 and 9 respectively by first and second annular stoppers 14 and 15 circumferentially extended along the inner wall of the housing 1. An activated carbon layer 16 is formed by filling the space 30 defined by the inner wall of the housing 1 and the inner surface of the filters 12 and 13, with activated carbon. Accordingly, although air and fuel vapor can permeate the filters 12 and 13, activated carbon can not leak therefrom. The activated carbon layer 16 is contained in the middle of the casing 1 along the axis A, and a first chamber 17 is formed in a interior of the housing 1 at one axial end thereof and is defined at one end by the activated carbon layer 16, and a second chamber 18 is formed in the interior of the housing 1 at the other axial end portion thereof and is defined at one end by the other end of activated carbon layer 16.

The first and second chambers 17, 18 are empty spaces and do not contain the activated carbon. Since the filter 12 and 13 are made from nylon, if the stoppers 14 and 15 are not provided, the upper portions of the filters 12 and 13 will move away from the separators 8 and 9, and when the space 30 is filled with activated carbon, the activated carbon will leak from the grooves 8*a* and 9*a* of the separators 8 and 9 into the first and second chambers 17 and 18. In this embodiment, the filters 12 and 13 are firmly held against the separators 8 and 9 by the stoppers 14 and 15, and therefore a leakage of activated carbon can not occur.

An outside air inlet pipe 19 extends through the first chamber 17, the centers of the separators 8 and 9 and filters 12 and 13, and the activated carbon layer 16 along the axis A, and communicates the second chamber 18 with the outside air. A fuel vapor inlet pipe 20 connects an upper space of the fuel tank 5 to the first chamber 17, and a purge pipe 21 connects the first chamber 17 to a purge port 22, which is open to the intake passage 3 upstream of the throttle valve 4 when the throttle valve 4 is in the idling position, and is open to the intake passage 3 downstream of the throttle valve 4 when the throttle valve 4 is open. Both the outside air inlet pipe 19 and the fuel vapor inlet pipe 20 extend along the axis A, and extend outwardly from a right end surface 7C (as seen in the Figure) of the lower housing 7, perpendicular to the axis A. Also the purge pipe 21 extends along the axis A, and extends outwardly from a right side surface 6C (as seen in the Figure) of the upper housing 6 perpendicular to the axis A.

A cover plate 23 is attached to the inner wall of the lower housing 7 in such a manner that it covers the parting line, i.e., the joint between the upper housing 6 and the lower housing 7. This cover plate 23 prevents a spattering of welding material when the flanges 6*a* and 7*a* of the upper and lower housings 6 and 7 are welded together, and therefore, a melting of and damage to the nylon filters 12 and 13 by hot metal is prevented. An opening 24 is formed centrally in the top wall 6*b* between the ends of the upper housing 6, and activated carbon is charged into the space 30 through this opening 24, a guide wall 6*d* is formed by bending inward the peripheral portion of the top wall 6*b* around the opening 24. After the activated carbon has been charged into the space 30 via the opening 24, a plate 25 is inserted into the opening 24 and flush with the guide wall 6*d*, and rests on the charged activated carbon. A compression spring 26 is positioned on the plate 25, and a lid 27 covering the opening 24 is secured to the top wall 6*b* of the upper housing 6 by bolts 28 and 29, whereby the plate 25 is urged by the compression spring 26 against the activated carbon. Accordingly, the activated carbon is compressed by the compression spring 26 via the plate 25, and will not move when the housing 1 is vibrated. In this embodiment, since the lid 27 need not be welded or caulked to the housing 1 after the space 30 is charged with activated carbon, it is easy to seal the housing 1, and further, since a rust prevention treatment and painting of a welded portion is not needed after charging the space 30 with the activated carbon, the rust prevention treatment and painting can be completed before charging the housing 1 with the activated carbon.

The area of the section of the activated carbon layer 16, which is perpendicular to the axis A, is approximately constant, except for the area taken up by the opening 24, and is approximately equal to the area of the interior section of the housing 1.

When a large amount of fuel vapor is produced in the fuel tank 5, fuel vapor is fed into the first chamber 17 via the fuel vapor inlet pipe 20, is diffused therein, and is fed into the activated carbon layer 16 via the groove 8*a* and the first filter 12. In the first chamber 17, fuel vapor is diffused over the whole section perpendicular to the axis A, and is in equal contact with the activated carbon layer 16 over the whole section vertical to the axis A. The fuel component in the fuel vapor is absorbed by the activated carbon layer 16 while passing therethrough. Gas from which the fuel component has been extracted is fed into the second chamber 18 via the second filter 13 and the groove 9*a*, and is allowed to escape to the outside atmosphere.

When a fuel purge is carried out, air is fed from the outside air inlet pipe 19 into the second chamber 18, and in the second chamber 18, air is diffused and flows through the activated carbon layer 16 over the whole section vertical to the axis A. The air passing through the activated carbon layer 16 desorbs the fuel component from the activated carbon in the charcoal canister, and the desorbed fuel component is then fed into the intake passage 3 from the purge port 22 via the first chamber 17 and the purge pipe 21. When the fuel component is desorbed from the activated charcoal, the heat contained in the active charcoal is removed therefrom by the desorption of the fuel components therein, and thus the air inlet pipe 19 is cooled whereby purge air passing through the outside air inlet pipe 19 is also cooled. When a high temperature outside air is fed into the charcoal canister via the outside air inlet pipe 19, desorption of the fuel components therein is rapidly increased, and a large amount of fuel is included in the purge air. In this embodiment, since the purge air passing through the outside air inlet pipe 19 is cooled, such a rapid increase of the desorption of the fuel components in the charcoal canister is prevented.

Therefore, according to this embodiment, since the area of the section of the activated carbon layer 16 perpendicular to the axis A can be made approximately equal to an area of the section of the housing 1, also perpendicular to the axis A, an increase of the pressure loss in the charcoal canister is prevented.

Further, an effective area in which air and fuel vapor are in contact with the activated carbon is equal to the entire section area of the housing 1, and therefore, a reduction of the reaction velocity in the activated carbon layer 16 is prevented.

Furthermore, since the pipes 19, 20, and 21 extend outwardly from only one side of the housing 1, the pipe fitting work can be easily carried out.

Figure 3:
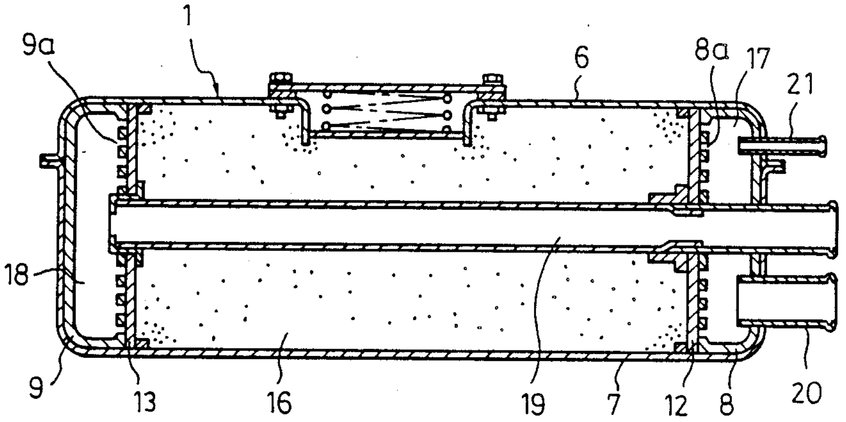
FIG. 3 is a longitudinal sectional view of the second embodiment of a charcoal canister of the present invention.

The second embodiment of this invention is shown in FIG. 3, wherein a charcoal canister according to the second embodiment is similar to the charcoal canister according to the first embodiment except that the separators 8 and 9 are formed into a box-like shape and the recesses 10 and 11 are not formed on the upper housing 6.

In the first embodiment, as shown in FIG. 2, at portions f and e of the joints between the upper housing 6 and the lower housing 7, and at each vertex a, b, c, and d, gaps are formed between the separators 8, 9 and the upper housing 6 and between the separators 8, 9 (FIG. 1) and the lower housing 7. Due to these gaps, activated carbon in the activated carbon layer 16 can leak through to the first and second chambers 17, 18, and that activated carbon could be emitted to the outside of the housing 1 through the pipes 19, 20, and 21 (FIG. 1). Accordingly these gaps must be sealed by, for example, rubber, to prevent the emission of activated carbon.

As shown in FIG. 3, in this embodiment, the separators 8, 9 are formed into a box-like shape, and fitted into the respective spaces defined at the axial ends of the activated carbon layer 16 in the housing 1. The first chamber 17 is formed in the first separator 8, and thus the first separator 8 represents a first chamber casing. The fuel vapor inlet pipe 20 and the purge pipe 21 are open to the first chamber 17. The second chamber 18 is formed in the second separator 9, and thus the second separator 9 represents a second chamber casing. The outer air inlet pipe 19 is open to the second chamber 18. On the side surfaces of the separators 8, 9, which face each other, grooves **8*a*, 9*a*** are formed in the same way as in the first embodiment.

According to this embodiment, even if activated carbon in the activated carbon layer 16 leaks out through the gaps between the separators 8, 9 and the upper housing 6, and between the separators 8, 9 and the lower housing 7, this activated carbon only enters the gaps between the separators 8, 9 and the upper housing 6, and between the separators 8, 9 and the lower housing 7, and does not enter the first and second chambers 17, 18, and therefore, there is no possibility that activated carbon will be emitted outside of the housing 1 through the pipes 19, 20, and 21.

In this embodiment, an effect similar to the effect of the first embodiment can be obtained.

Figure 4:
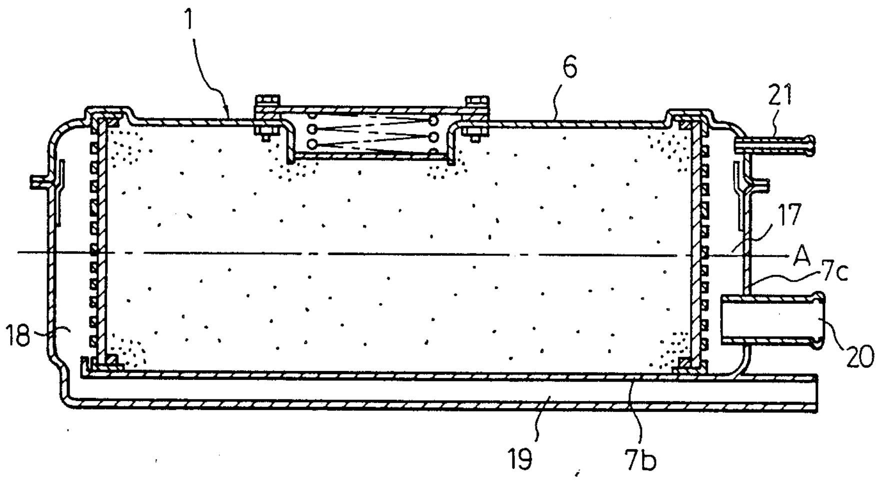
FIG. 4 is a longitudinal sectional view of the third embodiment of a charcoal canister of the present invention.
Figure 5:
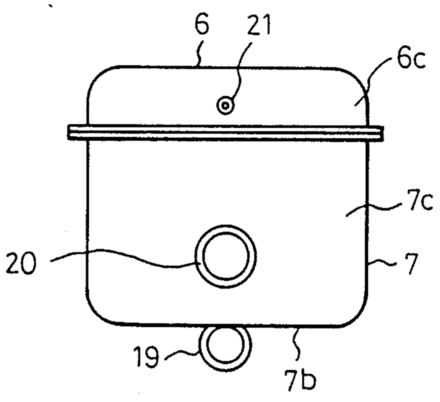
FIG. 5 is a right side view of FIG. 4.
Figure 6:
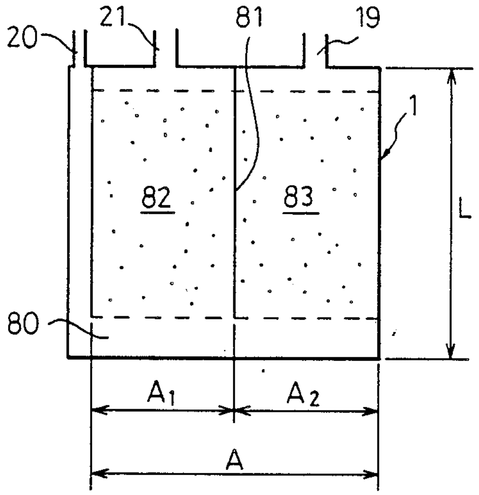
Fig. 6 PRIOR ART
FIG. 6 is a schematic sectional view of a charcoal canister of a prior art.

The third embodiment of this invention is shown in FIGS. 4 and 5, wherein the outside air inlet pipe 19 is extended on the outer bottom wall **7*b* of the lower housing 7, along the axis A. The outside air inlet pipe 19 is connected to the second chamber 18 at the bottom thereof, and extends outwardly from the bottom wall 7*b* of the lower housing 7 which defines the first chamber 17**.

In this embodiment also, an effect similar to the effect of the first embodiment can be obtained.

Although the invention has been described with reference to specific embodiments chosen for purposes of illustration, it should be apparent that numerous modifications can be made without departing from the basic concept and scope of the invention.

We claim:

1. A charcoal canister for use in a fuel purge system of an internal combustion engine having an intake passage, said canister comprising:

- an axially extending housing, said housing including two housing elements divided along a separation line which extends along an axis of said housing;
- an activated carbon layer arranged in a central portion of an interior of said housing in an axial direction of said housing and extending over an entire cross section of said interior of said housing, which is perpendicular to said axis of said housing;
- a first chamber formed in said interior of said housing at one axial end portion of said housing and defined by one end of said activated carbon layer;
- a second chamber formed in said interior of said housing at the other axial end portion of said housing and defined by the other end of said activated carbon layer;
- a first pipe connected to said first chamber for feeding fuel vapor into said first chamber and extending outwardly from a housing wall portion which defines said first chamber;
- a second pipe connecting said first chamber to said intake passage and extending outwardly from said housing wall portion;
- a third pipe connected to said second chamber for feeding air into said second chamber and extending outwardly from said housing wall portion;
- a separator arranged at each axial end of said activating carbon layer, said one end of said activated carbon layer and said other end of said activated carbon layer are respectively defined by said separators; and
- two recesses formed at an inner surface of one of said housing elements, each separator having a portion fitted into one of said recesses and another portion fixed to an inner surface of said other housing element.

2. A charcoal canister according to claim 1, wherein said first chamber and said second chamber are empty spaces.

3. A charcoal canister according to claim 1, wherein at said one end of said activated carbon layer, an area of a cross section of said activated carbon layer is equal to an area of a cross section of said first chamber, and at said other end of said activated carbon layer, an area of a cross section of said activated carbon layer is equal to an area of a cross section of said second chamber.

4. A charcoal canister according to claim 1, wherein said first pipe, said second pipe, and said third pipe are parallel to said axis.

5. A charcoal canister according to claim 1, wherein said third pipe extends through said activated carbon layer.

6. A charcoal canister according to claim 1, wherein said housing wall portion is an end wall of said housing, which is positioned at one axial end of said housing and is approximately perpendicular to said axis.

7. A charcoal canister according to claim 1, wherein a covering member covering said separation line is arranged along said separation line inside of said housing, and said two housing elements are welded at said separation line.

8. A charcoal canister according to claim 1, further comprising two filters which are permeable to air and fuel vapor and two annular stoppers circumferentially extending along the inner wall of said housing, wherein each of said filters is secured on each of said separators by each of said stoppers so as to cover the entire said surface of each of said separators.

9. A charcoal canister according to claim 1, wherein said activated carbon layer is filled with activated carbon, and said activated carbon is under pressure.

10. A charcoal canister according to claim 1, wherein an opening for charging activated carbon into said activated carbon layer is formed in the housing which defines said activated carbon layer, and said opening is closed by a lid which is secured to said housing by a bolt.

* * * * *

UNITED STATES PATENT AND TRADEMARK OFFICE
CERTIFICATE OF CORRECTION

PATENT NO. : 4,986,840
DATED : 22 January 1991
INVENTOR(S) : Eiji Mori, et al.

It is certified that error appears in the above-identified patent and that said Letters Patent is hereby corrected as shown below:

Under "Assignee" on the title page of the patent, add the following assignee:

--Horie Metal Co., Ltd.
Toyota, Japan--

In column 1, line 65, replace "cross section" with --cross-section--.

In column 3, line 35, replace "a interior" with --an interior--.

Signed and Sealed this

Eighth Day of September, 1992

*Attest:*

DOUGLAS B. COMER

*Attesting Officer*

*Acting Commissioner of Patents and Trademarks*